(12) United States Patent
Konthalapally et al.

(10) Patent No.: US 11,855,854 B2
(45) Date of Patent: Dec. 26, 2023

(54) FRAMEWORK FOR DETERMINING METRICS OF AN AUTOMATION PLATFORM

(71) Applicant: Fortinet, Inc., Sunnyvale, CA (US)

(72) Inventors: Shravan K. Konthalapally, Pune (IN); Abhishek Narula, Pune (IN); Pooja Singh, Pune (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/856,027

(22) Filed: Jul. 1, 2022

(65) Prior Publication Data
US 2022/0337490 A1      Oct. 20, 2022

Related U.S. Application Data

(63) Continuation of application No. 17/139,689, filed on Dec. 31, 2020, now Pat. No. 11,394,623.

(51) Int. Cl.
*H04L 41/22* (2022.01)
*H04L 41/00* (2022.01)
(Continued)

(52) U.S. Cl.
CPC .......... *H04L 41/22* (2013.01); *H04L 41/0631* (2013.01); *H04L 41/14* (2013.01); *H04L 41/20* (2013.01)

(58) Field of Classification Search
CPC ..... H04L 41/22; H04L 41/0631; H04L 41/14; H04L 41/147; H04L 41/20; H04L 43/0823; H04L 43/08
See application file for complete search history.

(56) References Cited

U.S. PATENT DOCUMENTS

| 10,721,266 B1 * | 7/2020 | Herman-Saffar ... H04L 63/1441 |
| 11,327,827 B1 * | 5/2022 | Satish ..................... G06F 9/451 |

(Continued)

OTHER PUBLICATIONS

Singh, Vishakha, Indrajeet Gupta, and Prasanta K. Jana. "A novel cost-efficient approach for deadline-constrained workflow scheduling by dynamic provisioning of resources." Future Generation Computer Systems 79: 95-110. (Year: 2018).*

(Continued)

*Primary Examiner* — John M MacIlwinen
(74) *Attorney, Agent, or Firm* — Jaffery Watson Mendonsa Hamilton LLP

(57) ABSTRACT

Systems and methods for determining an efficiency score for an automation platform are provided. According to one embodiment, a first weight for each playbook of multiple playbooks of an automation framework and a second weight for each type of error of multiple types of errors that may cause execution of one of the multiple playbooks to fail are maintained. The first weight represents a relative importance of the playbook and the second weight represents an effort required to address the error. An efficiency score is calculated for execution of one or more playbooks of the multiple playbooks during a particular time period based on the first weight for each of the one or more playbooks and the second weight for each type of error observed during the particular time period. An indication of a health of the automation framework is then displayed based on the efficiency score.

20 Claims, 9 Drawing Sheets

(51) Int. Cl.
*H04L 41/14* (2022.01)
*H04L 41/0631* (2022.01)

(56) References Cited

U.S. PATENT DOCUMENTS

| | | | |
|---|---|---|---|
| 11,394,623 B1* | 7/2022 | Konthalapally | H04L 41/0631 |
| 2006/0229846 A1* | 10/2006 | Wright | G06Q 10/06 |
| | | | 702/182 |
| 2014/0250125 A1* | 9/2014 | Stuempfle | G06F 16/904 |
| | | | 707/737 |
| 2020/0104401 A1* | 4/2020 | Burnett | G06F 16/287 |
| 2021/0111980 A1* | 4/2021 | Gupta | H04L 41/147 |
| 2021/0133331 A1* | 5/2021 | Lipkis | H04L 63/145 |

OTHER PUBLICATIONS

Khorshed, Md Tanzim, ABM Shawkat Ali, and Saleh A. Wasimi. "A survey on gaps, threat remediation challenges and some thoughts for proactive attack detection in cloud computing." Future Generation computer systems 28.6: 833-851. (Year: 2012).*

Kandasamy, Kamalanathan, et al. "IoT cyber risk: A holistic analysis of cyber risk assessment frameworks, risk vectors, and risk ranking process." EURASIP Journal on Information Security 2020: 1-18. May 2020.*

* cited by examiner

| Error Type | Weight |
|---|---|
| Programming Language Syntax Errors | 3 |
| Referenced Workflows Deleted/Deactivated | 2 |
| Lack Of Permission To Execute A Certain Workflow Step | 2 |
| Timeout Errors When Handling Large Data Volumes | 5 |
| Error In Add-On/Integration Used In The Workflow | 6 |
| Miscellaneous Errors | 5 |
| Error In The Workflow Engine | 9 |

600A →

```
"HEADERS": {
    "TO": "",
    "SUBJECT": "",
    "FROM": "",
    "RECEIVED": [],
"SENDER": "",
"REPLY-TO": "",
    "CONTENT-TYPE": "",
    "RETURN-PATH": ""
}
```

600B →

| S.No | To | Subject | From | Received | Reply-To | Sender | Content-Type | Return-Path | Verdict (Pass/Fail) |
|------|----|---------|------|----------|----------|--------|--------------|-------------|---------------------|
| 1 | 1 | 1 | 1 | 1 | 1 | 1 | 1 | 0 | Pass |
| 2 | 1 | 1 | 1 | 1 | 1 | 0 | 0 | 1 | Pass |
| 3 | 1 | 1 | 1 | 1 | 0 | 1 | 0 | 0 | Fail |
| 4 | 1 | 0 | 1 | 1 | 0 | 0 | 0 | 0 | Fail |
| .... | .. | .. | ... | ... | ... | ... | .... | ..... | ..... |
| 100 | 1 | 1 | 1 | 1 | 1 | 1 | 1 | 1 | Pass |

FIG. 6

FRAMEWORK FOR DETERMINING METRICS OF AN AUTOMATION PLATFORM

CROSS REFERENCE TO RELATED APPLICATION

The present application is a continuation of U.S. patent application Ser. No. 17/139,689 entitled "FRAMEWORK FOR DETERMINING METRICS OF AN AUTOMATION PLATFORM", and filed Dec. 31, 2020 by Konthalapally et al. The entirety of the aforementioned reference is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, Fortinet, Inc.

BACKGROUND

Field

Embodiments of the present disclosure generally relate to automation frameworks. In particular, embodiments of the present disclosure relate to computing metrics (e.g., an efficiency score) for an automation framework, which may take into consideration the importance of different automated components of the automation framework and the effort expected to fix various automation challenges, and predicting the likelihood that automated workflows will be able to handle data sets different from those for which they were designed.

Description of the Related Art

Automated workflows form the backbone of multiple domains, including Security Orchestration, Automation and Response (SOAR), Robotic Process Automation (RPA), and Information Technology Service Management (ITSM). More and efficient automation facilitate faster responses, fewer manual errors, and improved Return on Investment (ROI).

SUMMARY

Systems and methods are described for determining an efficiency score for an automation platform. According to one embodiment, a first weight for each playbook of multiple playbooks of an automation framework and a second weight for each type of error of multiple types of errors that may cause execution of one of the multiple playbooks to fail are maintained. The first weight represents a relative importance of the playbook and the second weight represents an effort required to address the error. An efficiency score is calculated for execution of one or more playbooks of the multiple playbooks during a particular time period based on the first weight for each of the one or more playbooks and the second weight for each type of error observed during the particular time period. An indication of a health of the automation framework is then displayed based on the efficiency score.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 6 is an exemplary illustration of a predetermined input dataset and a corresponding vector space for playbook execution in automation framework based on the predetermined input dataset in accordance with an embodiment of the present disclosure.

DETAILED DESCRIPTION

Figure 1:
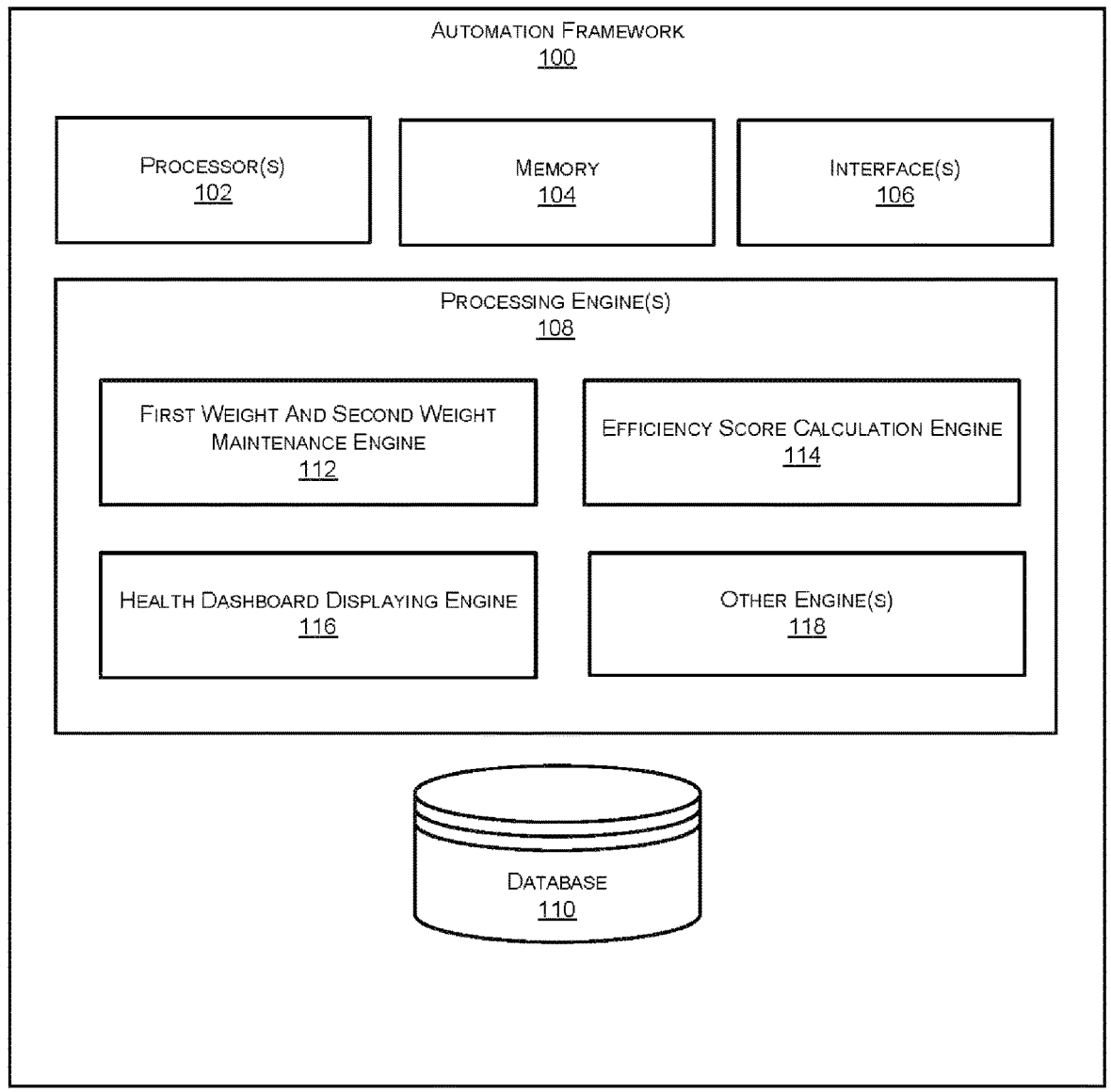
FIG. 1 is a block diagram illustrating functional components of an automation framework in accordance with an embodiment of the present disclosure.

Systems and methods are described for determining an efficiency score for an automation platform. At present, automation platforms may provide a binary indication (e.g., success/failure) regarding the execution of an automated workflow (e.g., a playbook). In order to more effectively improve operations of an automation platform, it would be helpful to have additional information/context. For example, in the context of a SOAR platform, a Security Operation Center (SOC) team faces the following challenges:

There are no measures of quality, robustness and effectiveness of a given automation workflow (e.g., a given playbook).

There is no mechanism to identify the existence of gaps (e.g., network connectivity/latency issues or technical training issues) in an automation workflow. Given a way to identify the gaps, an SOC manager would be in a better position to be able to identify ways to mitigate and improve the overall SOC automation health.

Ascertaining whether a given automation workflow has control measures in place to handle a similar dataset to that for which it was designed.

Various embodiments of the present disclosure seek to provide a configurable framework to facilitate calculation of metrics for an automation platform. In one embodiment, the framework provides a method for calculating an efficiency score of individual automation workflows executed by the automation platform and aggregates the individual efficiency scores to provide information regarding the overall health of the automation platform. Depending upon the particular implementation, the framework may provide an optional ability for a user to define a weight for each individual type of workflow to reflect, for example, the contribution of the failure of a particular workflow to the overall efficiency of the automation platform. For example, suppose an SOC automation has one high priority playbook that handles enriching alerts/incidents for input into a SOAR platform and represents the main trigger/starting condition for further automated actions. If this high priority playbook fails due to an error, then the SOC automation health is effectively 0% as no downstream automations can be performed. Similarly, if the high priority playbook runs successfully but takes a longer time than expected to enrich the alerts/incidents, then the time for remediating such alerts/incidents will necessarily also increase, thereby affecting SOC performance.

Some embodiments may additionally provide insight into the reason(s) for a failure/delay in automation workflow execution. Non-limiting examples of reasons for failures/delay in the execution of an automation workflow include (i) a lack/gap in technical knowledge of playbooks development and/or design aspects; (ii) human errors (e.g., syntax errors); (iii) errors in the third-party integrations, which are accessed via various connectors; and (iv) the volume of input data exceeding that which is capable of being processed by the playbook.

Some embodiments may additionally predict the likelihood of successfully executing an automation workflow on a dataset different from that for which it was designed. For example, it may be desirable to evaluate whether an automation workflow originally designed and implemented to identify phishing emails from a particular data source (e.g., a mail server supporting Internet Message Access Protocol (IMAP) or Post Office Protocol (POPS)) will run based on a different data source (e.g., a Microsoft Exchange server mailbox) and the probability of success or failure.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein an "incident" generally refers to any malicious act or suspicious event observed within a protected network. Such malicious acts typically (i) compromise or represent an attempt to compromise the logical border surrounding a network to which assets (e.g., programmable electronic devices and communication networks including hardware, software, and data) are connected and for which access is controlled or (ii) disrupt or represent an attempt to disrupt such assets. Non-limiting examples of types or classes of incidents include unauthorized attempts to access systems or data, privilege escalation attacks, unusual behavior from privileged user accounts, insider threats (e.g., insiders trying to access servers and data that isn't related to their jobs, logging in at abnormal times from unusual locations, or logging in from multiple locations in a short time frame), anomalies in outbound network traffic (e.g., uploading large files to personal cloud applications, downloading large files to external storage devices, or sending large numbers of email messages with attachments outside the company), traffic sent to or received from unknown locations, excessive consumption of resources (e.g., processing, memory and/or storage resources), changes in configuration (e.g., reconfiguration of services, installation of startup programs, the addition of scheduled tasks, changes to security rules or firewall changes), hidden files (may be considered suspicious due to their file names, sizes or locations and may be indicative that data or logs may have been leaked), unexpected changes (e.g., user account lockouts, password changes, or sudden changes in group memberships), abnormal browsing behavior (e.g., unexpected redirects, changes in browser configuration, or repeated pop-ups), suspicious registry entries, phishing attacks, malware attacks, denial-of-service (DoS) attacks, man-in-the-middle attacks, and password attacks.

Exemplary embodiments will now be described more fully hereinafter with reference to the accompanying drawings, in which exemplary embodiments are shown. This invention may, however, be embodied in many different forms and should not be construed as limited to the embodiments set forth herein.

Systems and methods are described for determining an efficiency score for an automation platform According to various embodiments of the present disclosure, a first weight for each playbook of multiple playbooks of an automation framework and a second weight for each type of error of multiple types of errors that may cause execution of one of the multiple playbooks to fail are maintained. The first weight represents a relative importance of the playbook, and the second weight represents an effort required to address the error. An efficiency score after an execution run of the automation framework is calculated using the maintained first weight and second weight. Based on the calculated efficiency score, a health dashboard pertaining to health of the automated framework is displayed.

FIG. 1 is a block diagram illustrating functional components of an automation framework 100 in accordance with an embodiment of the present disclosure. Non-limiting examples of automation frameworks or automation platforms include Security Orchestration, Automation and Response (SOAR) platforms, Robotic Process Automation (RPA) platforms, and Information Technology Service Management (ITSM) platforms.

In the context of the present example, automation framework 100 may include one or more processor(s) 102. Processor(s) 102 may be implemented as one or more microprocessors, microcomputers, microcontrollers, digital signal processors, central processing units, logic circuitries, and/or any devices that manipulate data based on operational instructions. Among other capabilities, processor(s) 102 are configured to fetch and execute computer-readable instructions stored in a memory 104 of automation framework 100. Memory 104 may store one or more computer-readable instructions or routines, which may be fetched and executed to create or share the data units over a network service. Memory 104 may include any non-transitory storage device including, for example, volatile memory such as RAM, or non-volatile memory such as EPROM, flash memory, and the like. In an example embodiment, memory 104 may be a local memory or may be located remotely, such as a server, a file server, a data server, and the Cloud.

Automation framework 100 may also include one or more Interface(s) 106. Interface(s) 106 may include a variety of interfaces, for example, interfaces for data input and output devices, referred to as I/O devices, storage devices, and the like. Interface(s) 106 may facilitate communication of automation framework 100 with various devices coupled to automation framework 100. Interface(s) 106 may also provide a communication pathway for one or more components of automation framework 100. Examples of such components include, but are not limited to, processing engine(s) 108 and database 110.

Processing engine(s) 108 may be implemented as a combination of hardware and software or firmware programming (for example, programmable instructions) to implement one or more functionalities of resource(s) may. In the examples described herein, such combinations of hardware and software or firmware programming may be implemented in several different ways. For example, the programming for the engine(s) 108 may be processor executable instructions stored on a non-transitory machine-readable storage medium and the hardware for engine(s) 108 may include a processing resource (for example, one or more processors), to execute such instructions. In the examples, the machine-readable storage medium may store instructions that, when executed by the processing resource, implement engine(s) 108. In such examples, automation framework 100 may include the machine-readable storage medium storing the instructions and the processing engine to execute the instructions, or the machine-readable storage medium may be separate but accessible to automation framework 100 and the processing engine. In other examples, processing engine(s) 108 may be implemented by electronic circuitry. Database 110 may include data that is either stored or generated as a result of functionalities implemented by any of the components of processing engine(s) 108.

In an example, processing engine(s) 108 may include first weight and second weight maintenance engine 112, efficiency score calculation engine 114, health dashboard displaying engine 116, and other engine(s) 118. Other engine(s) 118 may implement functionalities that supplement applications or functions performed by automation framework 100.

In an embodiment, first weight and second weight maintenance engine 112 maintains a first weight for each playbook of multiple playbooks of an automation framework and a second weight for each type of error of multiple types of errors that may cause execution of one of the plurality playbooks to fail. The first weight may represent a relative importance of the playbook. The second weight may represent an effort required to address the error. In another embodiment, when the error is a custom error, a regex expression may be received as an input such that the received input matches to an error message generated from a failed workflow of the playbook of the multiple playbooks.

In an embodiment, efficiency score calculation engine 114 calculates an efficiency score after an execution run of the automation framework using the maintained first weight and the second weight. The calculated efficiency score for the automation framework may be low when both the first weight and the second weight for each of the multiple playbooks are high.

In an embodiment, health dashboard displaying engine 116 displays a health dashboard pertaining to health of the automated framework. The health may be based on the calculated efficiency score. The displayed health dashboard may be depicted as a line graph over time and where an increasing slope of the graph may indicate a positive health of the automation framework for the execution run.

In an embodiment, the playbook may have a plurality of tags that are each associated with a corresponding rule of a set of predefined rules. The playbook may be assigned a highest weight among weights assigned to each of the plurality of tags.

In another embodiment, a health value of the automation framework may be set to zero when the first weight of the playbook of the plurality of playbooks is high.

In an embodiment, an execution state of an automation framework with a new dataset as input may be predicted. A training dataset may be created as a combination of a playbook log generated during each of a playbook execution run of multiple playbook execution runs. A vector space for at least one of a playbook execution run of the multiple playbook execution runs may be created based on the created training dataset. A verdict may be predicted pertaining to the execution state for the at least one of playbook execution run based on an overlap of the new dataset with the created training dataset.

The various functional components, engines, and modules (e.g., the first weight and second weight maintenance engine 112, the efficiency score calculation engine 114, and the health dashboard displaying engine 116) and other functional units described herein and the processing described below with reference to the flow diagrams of FIGS. 2, 3A, 4-5 and 9 may be implemented in the form of executable instructions stored on a machine readable medium and executed by one or more processing resources (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 10 below.

Figure 2:
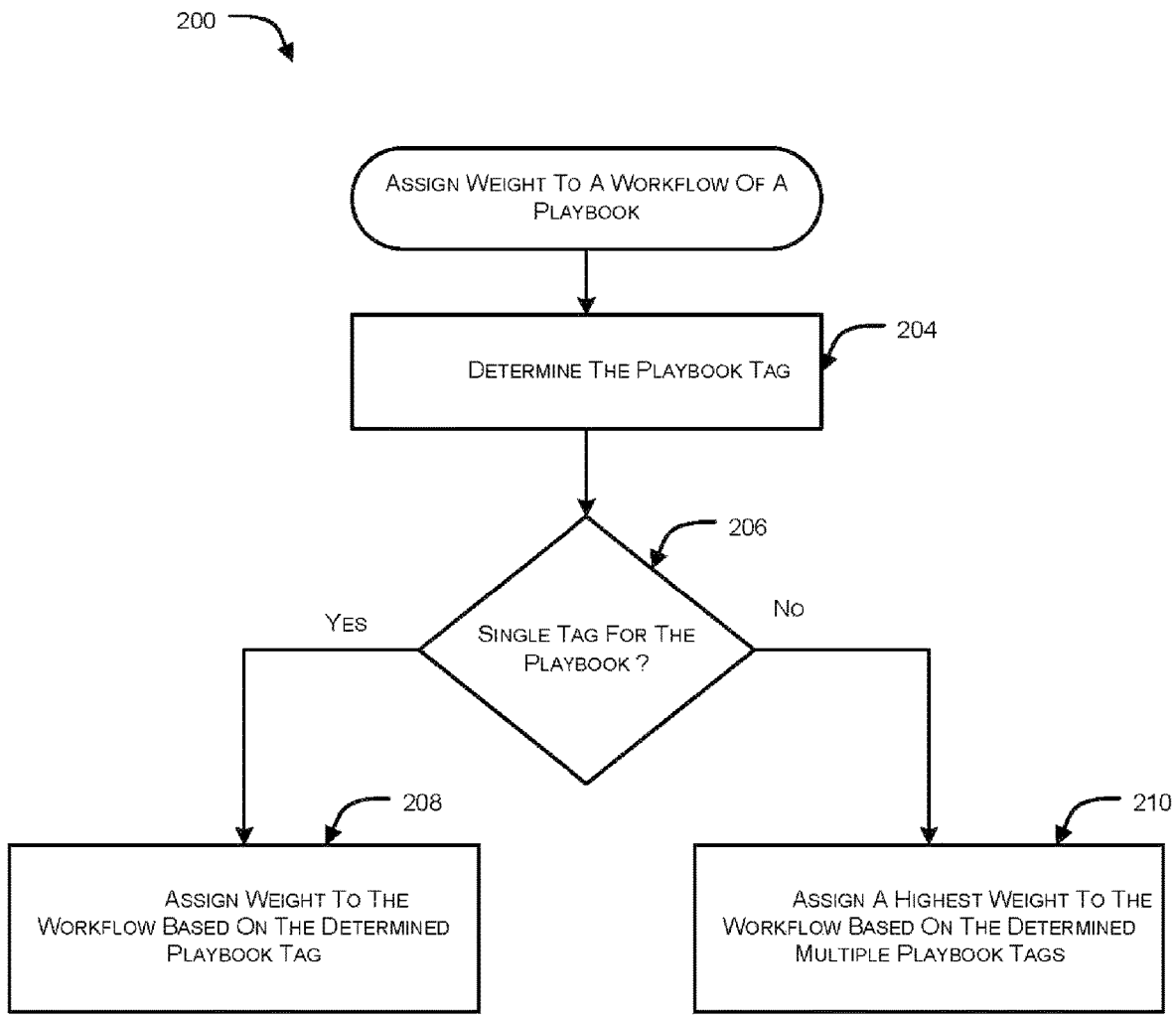
FIG. 2 is a flow diagram illustrating assignment of a weight to a workflow of a playbook in accordance with an embodiment of the present disclosure.

FIG. 2 is a flow diagram 200 illustrating assignment of a weight to a workflow of a playbook in accordance with an embodiment of the present disclosure. In the context of the present example, weights may be assigned on a scale of 1-10 and failure of more critical playbooks may contribute more to an overall score for an automation framework (e.g., automation framework 100) than lesser critical ones. At block 204, a playbook tag is determined. The playbook may be tagged and a score for the playbook may be defined based on the tags. For example, a rule may be defined such that playbooks tagged as, for example, as being associated with 'ingestion' may carry a weight of '9', whereas playbooks tagged as, for example, being associated with 'enrichment' may carry a weight of '6'. In one embodiment a default weight for a playbook may be set to '5'. At block 206, it is determined whether the playbook has a single tag. So, then at block 208, a weight is assigned to the workflow based on the determined tag of the playbook; otherwise, at block 210, a highest weight is assigned to the workflow based on the determined multiple playbook tags.

Figures 3A, 3B:
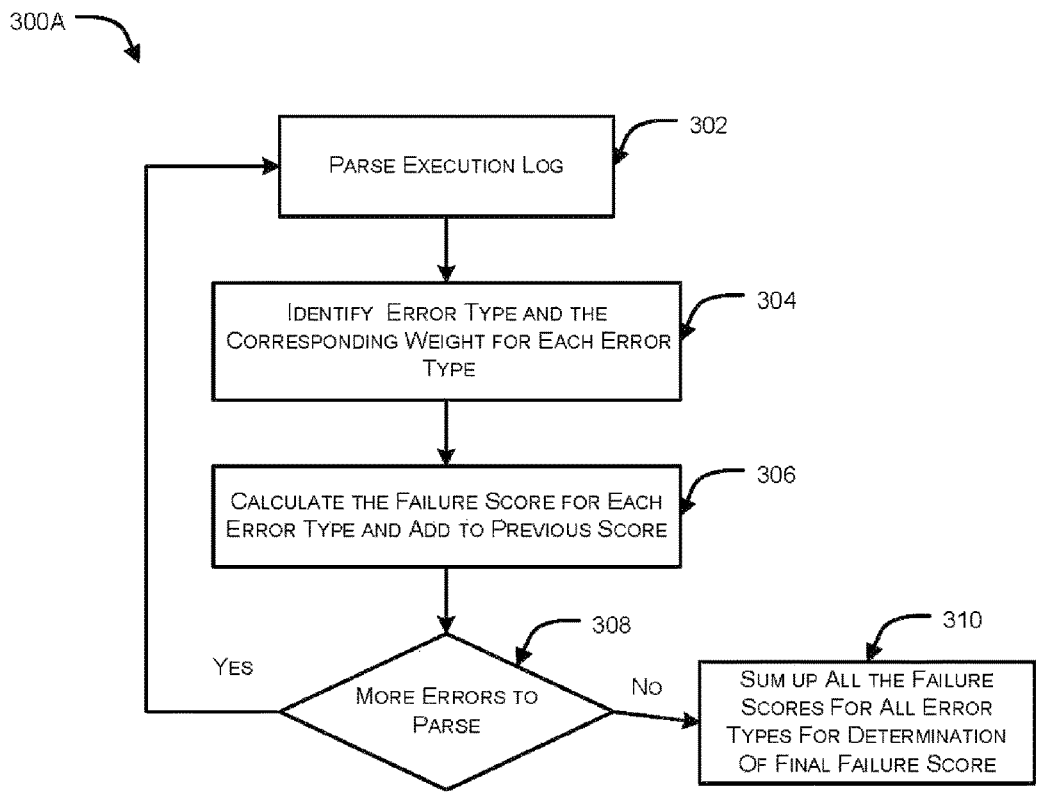
FIG. 3A is a flow diagram illustrating determination of a final failure score in accordance with an embodiment of the present disclosure.
FIG. 3B is a table illustrating various examples of types of errors that may occur during execution of a playbook and corresponding weights for the various examples of types of errors in accordance with an embodiment of the present disclosure.

FIG. 3A is a flow diagram 300A illustrating determination of a final failure score in accordance with an embodiment of the present disclosure. At block 302, an execution log is parsed. At block 304, for each error found in the execution log, a type of error is identified and a corresponding weight for each type of error is determined. Non-limiting examples of error types and corresponding weights described below with reference to FIG. 3B. At block 306, a failure score for each type of error is calculated and added to a previous determined score. At block 308, it is determined whether there are more errors to parse. If not, then at block 310, a sum of all the calculated failure scores is determined for all types of errors to determine a final failure score; otherwise, processing continues by looping back to block 302.

FIG. 3B is a table 300B illustrating various examples of types of errors that may occur during execution of a playbook and corresponding weights for the various examples of types of errors in accordance with an embodiment of the present disclosure. In the context of the present example, the weight of an error type "Error in the workflow engine" has a maximum weight to reflect the fact that addressing this type of error may involve an upgrade or a hot fix of an application itself. Further, the weight of an error type "Error in add-on/integration used in the workflow" is less since a fix to this error is expected to have a faster turnaround time and is easier to upgrade. Also, an error type e.g., "Programming language syntax errors" has a minimum weight since these errors may be fixed quickly without much effort.

In an embodiment, the types of errors listed in table 300B may be determined from the execution log. Automation framework 100 may have out-of-the-box support for default error types. For custom failure types, the user may provide a regex expression to match against an error message printed from a failure workflow.

In one embodiment, certain default error types and corresponding default weights may be included in table 300B. Alternatively or additionally, a user may be provided with the ability to define the types of errors, for example, by creating, revising, and/or deleting entries in table 300B via a user interface. The user may also be provided with the ability to define the corresponding weights for the types of errors.

Figure 4:
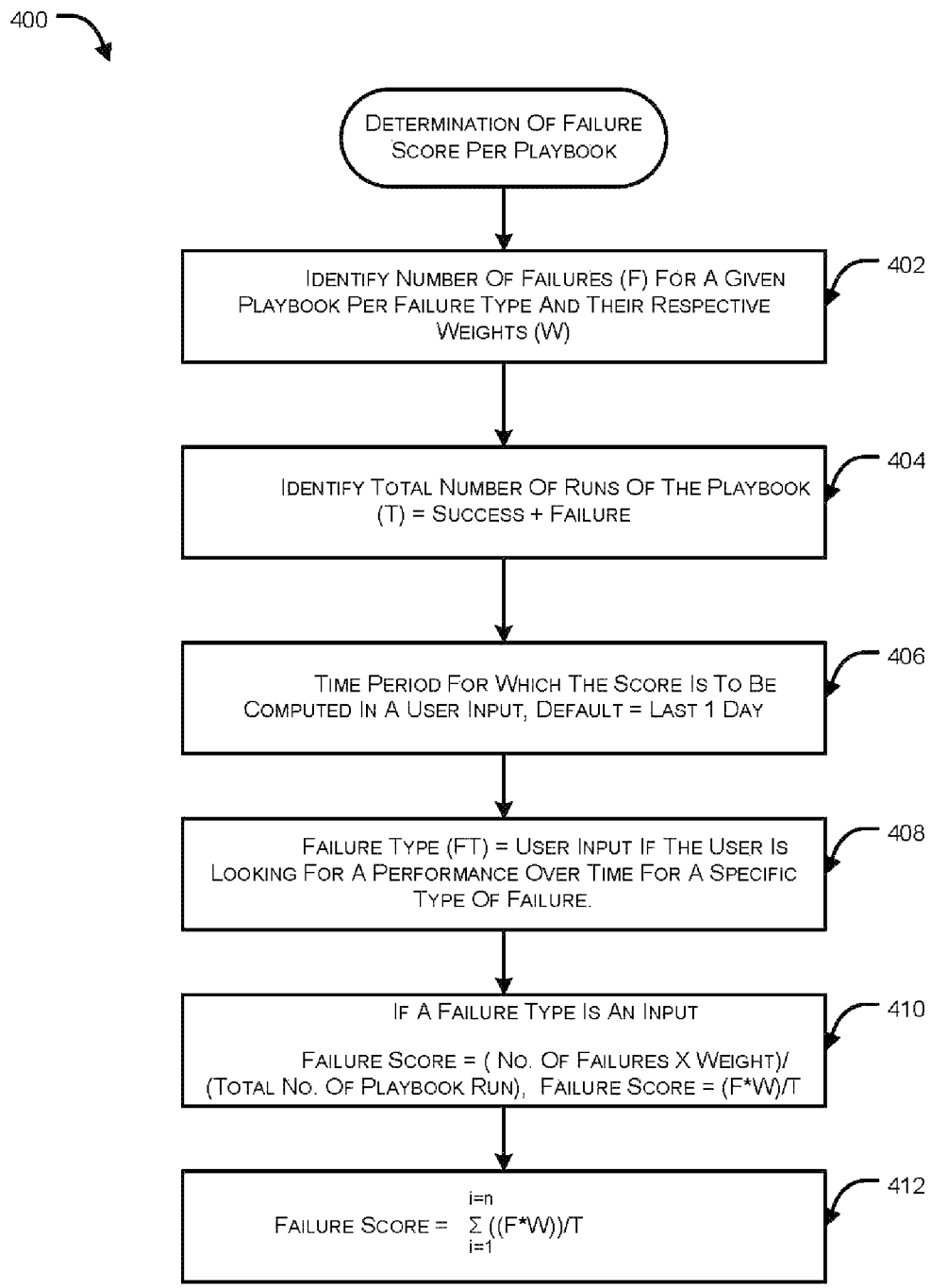
FIG. 4 is a flow diagram illustrating determination of a failure score per playbook in accordance with an embodiment of the present disclosure

FIG. 4 is a flow diagram 400 illustrating determination of a failure score per playbook in accordance with an embodiment of the present disclosure. The failure score for a playbook may reflect a measure of robustness of the workflow. A decrease in the failure score over time may indicate increased robustness of the playbook in relation to various aspects, for example, handling scale, diversity in input, and intermittent environment errors.

At block 402, a number of failures (F) for a given playbook per failure type and their respective weights are determined. In one embodiment, after performing an execution run of an automation framework (e.g., automation framework 100) the number of failures for a given playbook per failure type are determined by parsing an execution log. A corresponding weight (W) for each failure type may be read from a configuration file (e.g., table 300B of FIG. 3B) that maps various error types to corresponding weights.

At block 404, the total number of runs (T) of the playbook are identified. In one embodiment, the total number of runs includes both runs that completed successfully and runs that failed.

At block 406, a time period is determined for which the score is to be computed. In one embodiment, the time period may be a user configurable value. By default, the time period may be set to a trailing 24 hour period.

At block 408, one or more optional Failure Types (FTs) may be determined. For example, if the user wants to evaluate the performance over time for one or more specific types of failures, the user may input the specific failure types; otherwise, the failure score processing may perform an evaluation for all available FTs.

Figure 5:
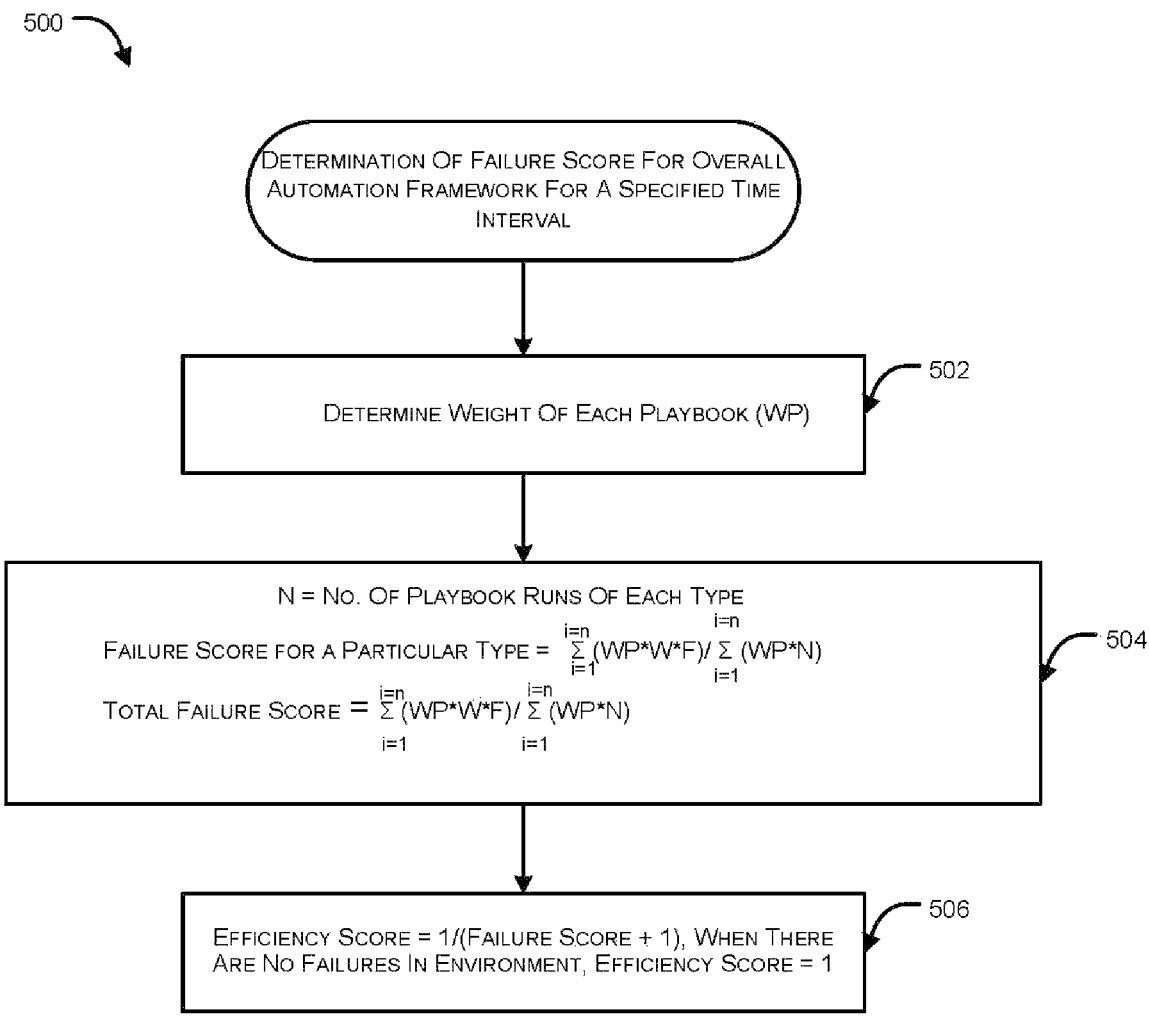
FIG. 5 is a flow diagram illustrating processing for determination of a failure score for an overall automation framework in accordance with an embodiment of the present disclosure.

At block 410, when one or more FTs were input by the use, then the failure score is calculated for only those input by the user based on the number of failures for the FTs at issue, their corresponding weights, and the total number of runs (T) of the playbook. According to one embodiment, the failure score may be expressed as follows for each FT selected by the user and then aggregated:

$$\text{Failure Score} = (F*W)/T$$

where,
F is the number of failures for the FT;
W is the weight of the FT; and
T is the number of playbook runs At block 412, assuming a failure score is to be calculated for all available FTs, the failure score may be calculated as follows:

$$\text{Failure Score} = \Sigma_{i=1}^{i=n}(F_i*W_i)/T$$

where,
n is the number of FTs
$F_i$ is the number of failures for $FT_i$;
$W_i$ is the weight of $FT_i$; and
T is the number of playbook runs FIG. 5 is a flow diagram 500 illustrating processing for determination of a failure score for an overall automation framework in accordance with an embodiment of the present disclosure. At block 502, the weight of each playbook is determined as 'WP'. At block 504, various failure metrics may be determined. For example, the number of playbook runs of each FT may be determined and used in connection with calculating a failure score for a particular FT and/or a total failure score. According to one embodiment these failure scores may be determined as follows:

$$\text{Failure Score for a particular type} = \Sigma_{i=1}^{i=n}(WP*W*F)/\Sigma_{i=1}^{i=n}(WP*N);$$

where, n represents the total number of failures for a particular error type.

$$\text{Total Failure Score} = \Sigma_{i=1}^{i=n}(WP*W*F)/\Sigma_{i=1}^{i=n}(WP*N)$$

where, n represents the total number of failures for all error types.

At block 506, an efficiency score may be determined. According to one embodiment, the efficiency score may be calculated as follows:

$$\text{Efficiency Score} = 1/(\text{Failure Score}+1).$$

In this manner, where there are no failures in an environment, the efficiency score is 1 and as the number of failures increases the efficiency score becomes closer to 0.

In addition to or instead of providing the configurable framework to facilitate calculation of metrics for an automation platform as described above, some embodiments may additionally predict the likelihood of successfully executing an automation workflow on a dataset different from that for which it was designed.

FIG. 6 is an exemplary illustration of a predetermined input dataset 600A and a corresponding vector space 600B for playbook execution in automation framework based on the predetermined input dataset 600A in accordance with an embodiment of the present disclosure. According to one embodiment, an automation framework (e.g., automation framework 100) provides a capability to predict whether the playbook has control measures in place to successfully execute an input dataset that is different from the predetermined input dataset for which it was originally designed. A probability of success or failure of an automation workflow (e.g., a playbook) of the automation framework when applied to a new input dataset may be determined using historical datasets. For example, it may be desirable to evaluate whether an automation workflow originally designed and implemented to identify phishing emails from a particular data source (e.g., a mail server supporting Internet Message Access Protocol (IMAP) or Post Office Protocol (POPS)) will run based on a different data source (e.g., a Microsoft Exchange server mailbox) and the probability of success or failure.

According to one embodiment, a logistic regression model may be applied to the original dataset and associated execution history to compute the probability of a playbook passing or failing when run on a new dataset.

Automation framework may work on any of a classification or a prediction machine learning model and may create a training dataset using execution logs associated with a number of execution runs (e.g., 100 execution runs) of a particular playbook. The training dataset may be created as a combination of captured playbook logs where a verdict for each playbook execution may be captured by automation framework to create an N dimensional vector space based on the data-interchange format (e.g., JavaScript Object Notation (JSON)) and particular data fields (or keys) of the original input dataset (e.g., for Gmail). Based on the captured verdict and the data-interchange format and particular data fields (or keys) of the new input dataset the likelihood of the playbook successfully executing on the new input dataset (e.g., a Microsoft Exchange server mailbox) may be determined.

In one embodiment, the training dataset is created from the workflow's previous execution logs with the workflow inputs as the feature variables, and the outcome (whether the run is a success or a failure), as the field to be predicted. For example, An X-train dataframe may be generated with Boolean values against each key indicating the presence or absence of the key in each of the previous run inputs. The Y-train may also be a Boolean dataframe denoting whether the playbook ran successfully or failed. A supervised clustering algorithm, e.g., K-Nearest Neighbors, may then be applied to this training dataframe. A new input (for which an outcome of success or failure is to be predicted) is also converted into the Boolean X-test dataframe and the trained model may be asked for a prediction (Y-test) based on its previous learning of the outcome on presence or absence of the multiple feature keys.

Continuing with the present example, a dataset for Gmail headers is shown at 600A. Based on the dataset 600A an 'N' dimensional vector may be created for each playbook execution at 600B.

Figure 7:
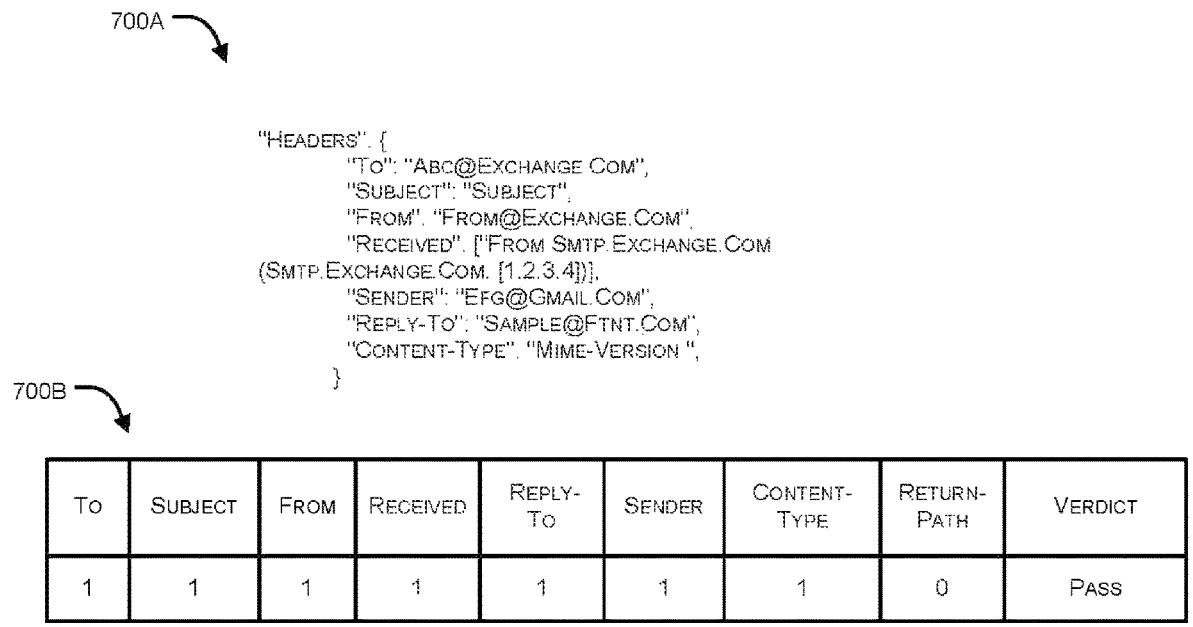
FIGS. 7-8 are example illustrations of a real time input dataset and a corresponding vector space for each playbook execution in the automation framework in accordance with an embodiment of the present disclosure.
Figure 8:
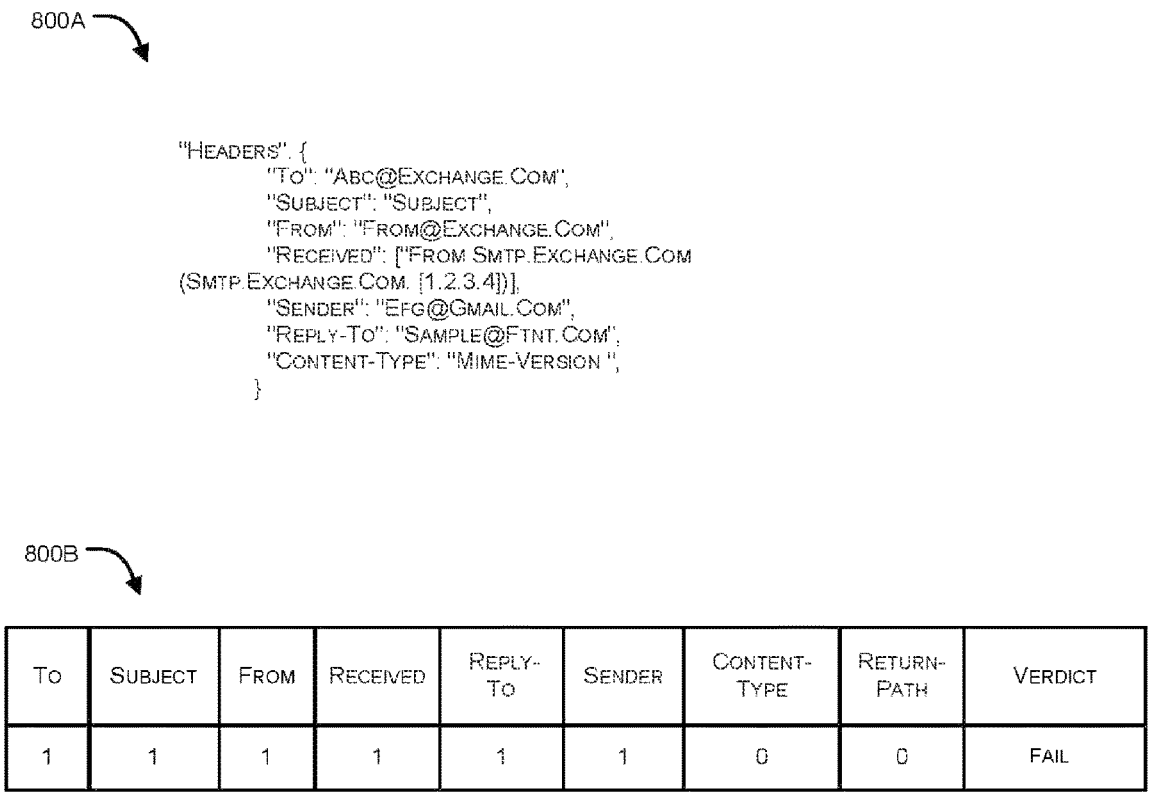

FIGS. 7-8 are exemplary illustrations of real time input dataset and a corresponding vector for each playbook execution in the automation framework in accordance with an embodiment of the present disclosure. In the context of the present example at 700A, is shown a real time input dataset for a different data source (e.g., Exchange email headers) for which a playbook at issue may be tested for likelihood of successful execution. Based on the fields of the input dataset, a vector representation may be created and may be represented at 700B as e.g., [1, 1, 1, 1, 1, 1, 1, 0]. Based on the previous training data, automation framework may use a supervised machine learning classification algorithm, e.g., the K-Nearest Neighbor algorithm, and may hence predict the verdict as being either a success or failure. In the context of the present example, the new input dataset includes 5 of 6 of the fields (keys) employed by the original dataset and the verdict received from automation framework is success (pass), indicating a high likelihood that the playbook will successfully run on the new input dataset. Depending upon the classification algorithm used, in alternative embodiments, the output may be expressed as a percentage (e.g., 5/6=83.333% likelihood of successful execution).

In the context of the present example at 800A is shown a real time input dataset for a different data source that may be tested for being a success or failure in automation framework 100. Based on the input dataset a vector representation may be created and may be represented at 800B as e.g., [1, 1, 1, 1, 1, 1, 0, 0]. Based on the previous training data, automation framework 100 may plot the vectors to determine in which of a cluster the vector may lie and hence predict the verdict as being a success or failure. For this example the verdict received from automation framework 100 is failure (fail).

In an exemplary embodiment, automation framework may calculate deviation between the two vectors which may depict a variation with vectors that have pass as verdict and features set missing. According to one embodiment, a similarity of the vector representations of the two datasets (e.g., the original input dataset and the new input dataset) may be determined. For example, suppose A and B are vector representation, then the similarity may be computed as follows:

$$\text{Similarity} = \cos(\theta) = \frac{A \cdot B}{\|A\|\|B\|} = \frac{\sum_{i=1}^{n}(A_i B_i)}{\sqrt{\sum_{i=1}^{n} A_i^2}\sqrt{\sum_{i=1}^{n} B_i^2}}$$

If the Similarity is 0, then there is a huge difference between the two vectors and the likelihood of successfully applying the playbook to the new input dataset is 0%, whereas if the Similarity is 1, then the vectors are identical and the likelihood of successful playbook execution on the new input data set is 100%. For purposes of illustration, the similarity score for an original input dataset (ORG) and a new input dataset (NEW) each having the same three data fields in their respective JSON representations may be calculated as follows:

Vector representation of ORG=[1,1,1]

Vector representation of NEW=[1,1,1]

Similarity (ORG,NEW)=(1*1+1*1+1*1)/√1²+1²+1²×√1²+1²+1²=1

Figure 9:
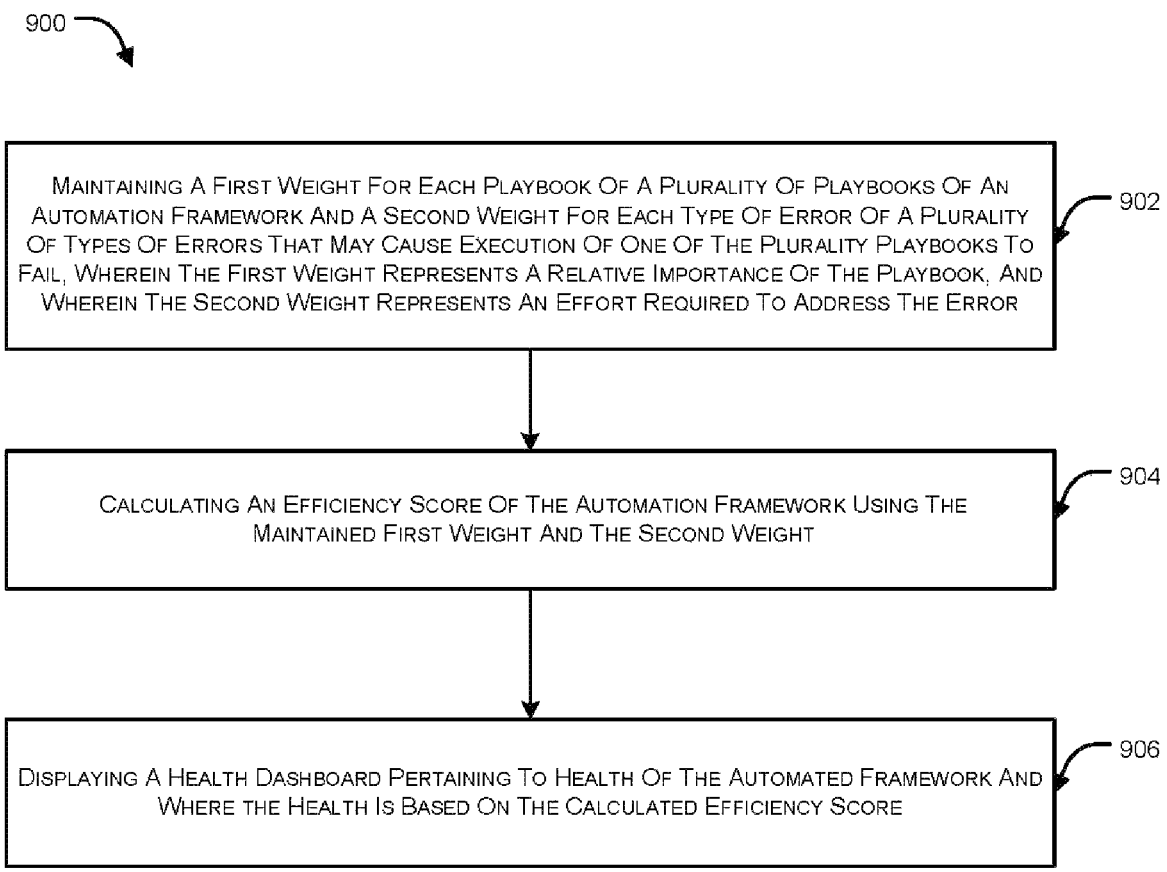
FIG. 9 is a flow diagram illustrating determination of an efficiency score and thus health of an automation framework in accordance with an embodiment of the present disclosure.

FIG. 9 is a flow diagram 900 illustrating determination of an efficiency score and thus health of an automation framework in accordance with an embodiment of the present disclosure. At block 902, one or more weighting factors may be maintained for each playbook of multiple playbooks of an automation framework and for each type of error that may cause execution of a playbook to fail. In some embodiments, default error types and corresponding weights may be prepopulated with default values. A first weight may represent, for each playbook, a relative importance of a particular playbook and a second weight may represent, for each type of error that may cause execution of one of the playbooks to fail, an effort required to address the error. Depending upon the particular implementation, a user may have the ability to define the types of errors, for example, by creating, revising, and/or deleting entries in a configuration file. The user may also be provided with the ability to define the corresponding weights for the types of errors.

At block 904, an efficiency score for the one or more playbooks may be calculated. According to one embodiment, the efficiency score is calculated for a particular time period (e.g., 24 hours, one or more days, etc.), which may be user configurable or predefined, and based on the first weight for each of the one or more playbooks and the second weight for each type of error observed during the particular time period. In one embodiment, the errors may be identified by parsing an execution log for the particular time period and corresponding weights may be retrieved from the configuration file (e.g., Table 300B of FIG. 3B).

At block 906, an indication of a health of the automation framework may be displayed to the user based on the efficiency score. According to one embodiment, the indication of the health of the automation framework may be displayed on a health dashboard.

Figure 10:
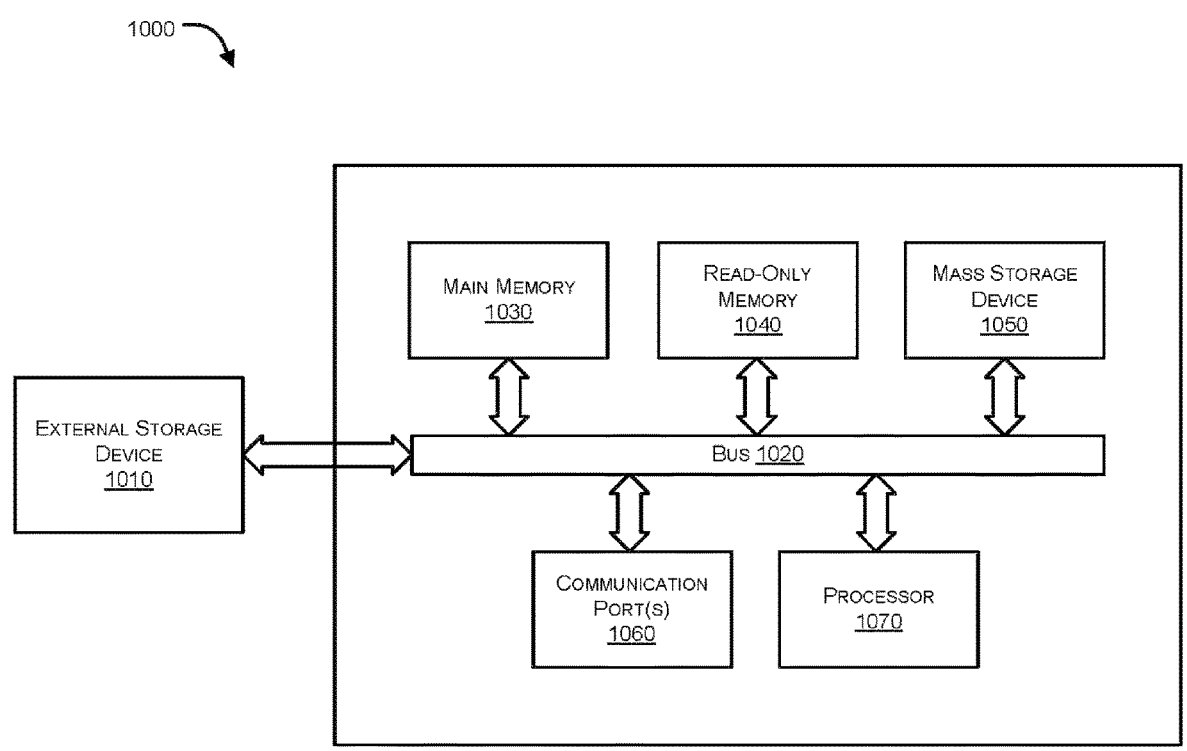
FIG. 10 illustrates an example computer system in which or with which embodiments of the present disclosure may be utilized.

FIG. 10 illustrates an exemplary computer system 1000 in which or with which embodiments of the present disclosure may be utilized. As shown in FIG. 10, computer system includes an external storage device 1010, a bus 1020, a main memory 1030, a read only memory 1040, a mass storage device 1050, a communication port 1060, and a processing resource (e.g., a processor 1070). In one embodiment, computer system 1000 may represent some portion of an automation framework (e.g., automation framework 100) or may represent a separate computer system that monitors performance of the automation framework.

Those skilled in the art will appreciate that computer system 800 may include more than one processor 870 and communication ports 860. Non-limiting examples of processor 870 include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processor 870 may include various modules associated with embodiments of the present disclosure.

Communication port 1060 can be any of an RS-232 port for use with a modem based dialup connection, a 10/100 Ethernet port, a Gigabit or 10 Gigabit port using copper or fiber, a serial port, a parallel port, or other existing or future ports. Communication port 1060 may be chosen depending on a network, such a Local Area Network (LAN), Wide Area Network (WAN), or any network to which computer system connects.

Memory 1030 can be Random Access Memory (RAM), or any other dynamic storage device commonly known in the art. Read only memory 1040 can be any static storage device(s) e.g., but not limited to, a Programmable Read Only Memory (PROM) chips for storing static information e.g. start-up or BIOS instructions for processor 1070.

Mass storage 1050 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage and communication blocks. Bus 1020 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1070 to software system.

Optionally, operator and administrative interfaces, e.g. a display, keyboard, and a cursor control device, may also be coupled to bus 1020 to support direct operator interaction with computer system. Other operator and administrative interfaces can be provided through network connections connected through communication port 1060. External storage device 1010 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method for evaluating an automation framework, the method comprising:
    accessing, by a processing resource, an execution log for a playbook, wherein the execution log includes a plurality of result sets wherein each of the plurality of result sets includes a plurality of historical playbook inputs and a corresponding historical outcome, and wherein the playbook is configured to execute a first input dataset;
    receiving, by the processing resource, a second input dataset to which the playbook is to be applied;
    using, by the processing resource, a training data set to predict a likelihood that the playbook has sufficient control measures to successfully execute the second input dataset, wherein the training dataset includes a plurality of vectors formed of at least some of the result sets;
    calculating, by the processing resource, an efficiency score for the playbook;
    displaying, by the processing resource, an indication of a health of the automation framework based on the efficiency score; and
    notifying, by the processing resource, a user of the likelihood.

2. The method of claim 1, wherein using the training dataset to predict the likelihood that the playbook has sufficient control measures comprises:
    applying, by the processing resource, a regression algorithm to a combination of the training dataset and the second input dataset.

3. The method of claim 1, wherein calculating the efficiency score comprises:
    maintaining, by the processing resource, a first weight for each playbook of a plurality of playbooks of an automation framework and a second weight for each type of error of a plurality of types of errors that may cause execution of one of the plurality playbooks to fail, wherein the first weight represents a relative importance of the playbook, and wherein the second weight represents an effort required to address the error; and
    calculating, by the processing resource, the efficiency score for execution of one or more playbooks of the plurality of playbooks during a particular time period based on the first weight for each of the one or more playbooks and the second weight for each type of error observed during the particular time period.

4. The method of claim 1, wherein the indication of the health is displayed in a health dashboard in the form of a line graph over time and wherein an increasing slope of the line graph indicates a positive health of the automation framework.

5. The method of claim 1, wherein when the playbook has a plurality of tags associated with a plurality of weights and the wherein the playbook is assigned a highest weight among the plurality of weights.

6. The method of claim 1, wherein the first input dataset is expressed in a first data-interchange format on the second input dataset expressed in a second data-interchange format based on a measure of similarity between a set of data fields defined by the first data-interchange format and a set of data fields defined by the second data-interchange format.

7. The method of claim 1, wherein the likelihood corresponds to a number of gaps in the playbook.

8. The method of claim 7, wherein the gaps include: a network connectivity issue, or a network latency issue.

9. A system comprising:
    a processing resource; and
    a non-transitory computer-readable medium, coupled to the processing resource, having stored therein instructions that when executed by the processing resource cause the processing resource to perform a method comprising:
        accessing an execution log for a playbook, wherein the execution log includes a plurality of result sets wherein each of the plurality of result sets includes a plurality of historical playbook inputs and a corresponding historical outcome, and wherein the playbook is configured to execute a first input dataset;
        receiving a second input dataset to which the playbook is to be applied;
        using a training data set to predict a likelihood that the playbook has sufficient control measures to successfully execute the second input dataset, wherein the training dataset includes a plurality of vectors formed of at least some of the result sets;

reporting the likelihood via a display;
calculating an efficiency score for the playbook; and
displaying an indication of a health of the automation framework based on the efficiency score.

10. The system of claim 9, wherein using the training dataset to predict the likelihood that the playbook has sufficient control measures comprises: applying a regression algorithm to a combination of the training dataset and the second input dataset.

11. The system of claim 9, wherein calculating the efficiency score comprises:
maintaining a first weight for each playbook of a plurality of playbooks of an automation framework and a second weight for each type of error of a plurality of types of errors that may cause execution of one of the plurality playbooks to fail, wherein the first weight represents a relative importance of the playbook, and wherein the second weight represents an effort required to address the error; and
calculating the efficiency score for execution of one or more playbooks of the plurality of playbooks during a particular time period based on the first weight for each of the one or more playbooks and the second weight for each type of error observed during the particular time period.

12. The system of claim 9, wherein the indication of the health is displayed in a health dashboard in the form of a line graph over time and wherein an increasing slope of the line graph indicates a positive health of the automation framework.

13. The system of claim 9, wherein when the playbook has a plurality of tags associated with a plurality of weights and the wherein the playbook is assigned a highest weight among the plurality of weights.

14. The system of claim 9, wherein the first input dataset is expressed in a first data-interchange format on the second input dataset expressed in a second data-interchange format based on a measure of similarity between a set of data fields defined by the first data-interchange format and a set of data fields defined by the second data-interchange format.

15. The system of claim 9, wherein the likelihood corresponds to a number of gaps in the playbook, and wherein the gaps include: a network connectivity issue, or a network latency issue.

16. A non-transitory computer-readable storage medium embodying a set of instructions, which, when executed by a processing resource of a computer system, causes the processing resource to perform a method comprising:
accessing an execution log for a playbook, wherein the execution log includes a plurality of result sets wherein each of the plurality of result sets includes a plurality of historical playbook inputs and a corresponding historical outcome, and wherein the playbook is configured to execute a first input dataset;
receiving a second input dataset to which the playbook is to be applied;
using a training data set to predict a likelihood that the playbook has sufficient control measures to successfully execute the second input dataset, wherein the training dataset includes a plurality of vectors formed of at least some of the result sets; and
reporting the likelihood via a display; and
calculating an efficiency score for the playbook, wherein calculating the efficiency score includes:
maintaining a first weight for each playbook of a plurality of playbooks of an automation framework and a second weight for each type of error of a plurality of types of errors that may cause execution of one of the plurality playbooks to fail, wherein the first weight represents a relative importance of the playbook, and wherein the second weight represents an effort required to address the error; and
calculating the efficiency score for execution of one or more playbooks of the plurality of playbooks during a particular time period based on the first weight for each of the one or more playbooks and the second weight for each type of error observed during the particular time period.

17. The non-transitory computer readable medium of claim 16, wherein the non-transitory computer readable further embodies a set of instructions, which, when executed by a processing resource of a computer system, causes the processing resource to perform a method comprising:
displaying an indication of a health of the automation framework based on the efficiency score.

18. The non-transitory computer readable medium of claim 17, wherein the indication of the health is displayed in a health dashboard in the form of a line graph over time and wherein an increasing slope of the line graph indicates a positive health of the automation framework.

19. The non-transitory computer readable medium of claim 16, wherein when the playbook has a plurality of tags associated with a plurality of weights and the wherein the playbook is assigned a highest weight among the plurality of weights.

20. A method for evaluating an automation framework, the method comprising:
accessing, by a processing resource, an execution log for a playbook, wherein the execution log includes a plurality of result sets wherein each of the plurality of result sets includes a plurality of historical playbook inputs and a corresponding historical outcome, and wherein the playbook is configured to execute a first input dataset;
receiving, by the processing resource, a second input dataset to which the playbook is to be applied;
using, by the processing resource, a training data set to predict a likelihood that the playbook has sufficient control measures to successfully execute the second input dataset, wherein the training dataset includes a plurality of vectors formed of at least some of the result sets;
notifying, by the processing resource, a user of the likelihood; and
calculating, by the processing resource, an efficiency score for the playbook, wherein calculating the efficiency score includes:
maintaining, by the processing resource, a first weight for each playbook of a plurality of playbooks of an automation framework and a second weight for each type of error of a plurality of types of errors that may cause execution of one of the plurality playbooks to fail, wherein the first weight represents a relative importance of the playbook, and wherein the second weight represents an effort required to address the error; and
calculating, by the processing resource, the efficiency score for execution of one or more playbooks of the plurality of playbooks during a particular time period based on the first weight for each of the one or more playbooks and the second weight for each type of error observed during the particular time period.

* * * * *